United States Patent [19]
Haston

[11] Patent Number: 5,135,080
[45] Date of Patent: Aug. 4, 1992

[54] STAND UP FORK LIFT TRUCK SAFETY NET

[75] Inventor: Charles T. Haston, St. Albans, W. Va.

[73] Assignee: E. I. Du Pont de Nemours and Company, Wilmington, Del.

[21] Appl. No.: 693,528

[22] Filed: Apr. 30, 1991

[51] Int. Cl.$^5$ ............................................... B66B 9/20
[52] U.S. Cl. ...................................... 187/9 R; 280/748
[58] Field of Search ............ 187/1 R, 9 R; 280/727, 280/748, 749, 762; 296/146; 49/50, 56, 57

[56] References Cited
U.S. PATENT DOCUMENTS

| | | | |
|---|---|---|---|
| 3,049,373 | 8/1962 | Biggers | 296/106 |
| 3,502,368 | 3/1970 | Maxa | 280/748 |
| 4,043,582 | 8/1977 | Lyter | 280/749 |
| 4,103,625 | 8/1978 | Black | 108/44 |
| 4,215,895 | 8/1980 | Phillips | 296/202 |
| 4,273,360 | 6/1981 | McLoughlin et al. | 280/751 |
| 4,659,105 | 4/1987 | Ziaylek, Jr. | 280/748 |
| 4,840,248 | 6/1989 | Silverman | 180/272 |

Primary Examiner—Robert P. Olszewski
Assistant Examiner—Kenneth Noland

[57] ABSTRACT

A stand-up fork lift truck having its entry/exit opening covered by a flexible safety net which is securely fastened to one side of the opening and detachably attached to the other side and bottom with detachable fastening means.

3 Claims, 2 Drawing Sheets

STAND UP FORK LIFT TRUCK SAFETY NET

BACKGROUND OF THE INVENTION

The present invention relates to a safety device for stand-up, front loading, fork lift trucks. The device is a safety net that acts as a reminder to the operator to keep all parts of the lower body within the forklift at all times. This avoids injury caused by a limb being caught between a stationary object and the cab of the truck.

SUMMARY OF THE INVENTION

The present invention is a safety net for use with stand-up, front loading fork lift trucks. The net is generally rectangular in shape and covers the entry/exit opening into the cab of the fork lift truck. The net is made of a flexible material, e.g. polymers such as nylon, polyethylene, polypropylene, polyester, etc. or natural material such as cotton, or blends of such materials. The choice of material is not critical, nor is the mesh size of the net.

The safety net is attached to one side of the entry/exit opening of the cab in a secure manner, e.g. by bolts, tape, rivets, adhesives, etc. The opening can be either at the rear of the cab or on either or both sides.

The other side and bottom of the net are detachable from the cab to permit entry and exit from its interior. Any suitable means can be used to provide this detachable-attachment means, i.e. magnets, velcro, etc.

DESCRIPTION OF EMBODIMENTS OF THE INVENTION

Figure 1:
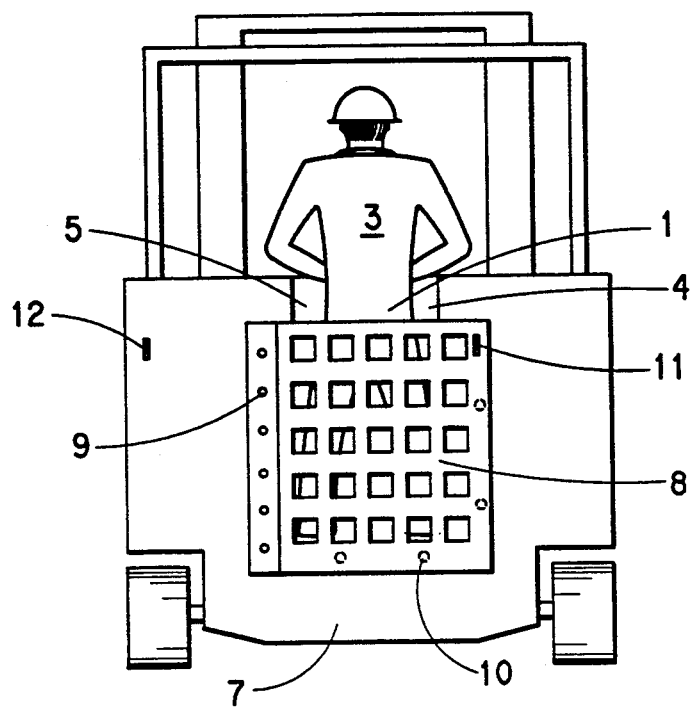
FIG. 1 is a rear view of a rear entry stand-up fork lift truck with the safety net in place.
Figure 2:
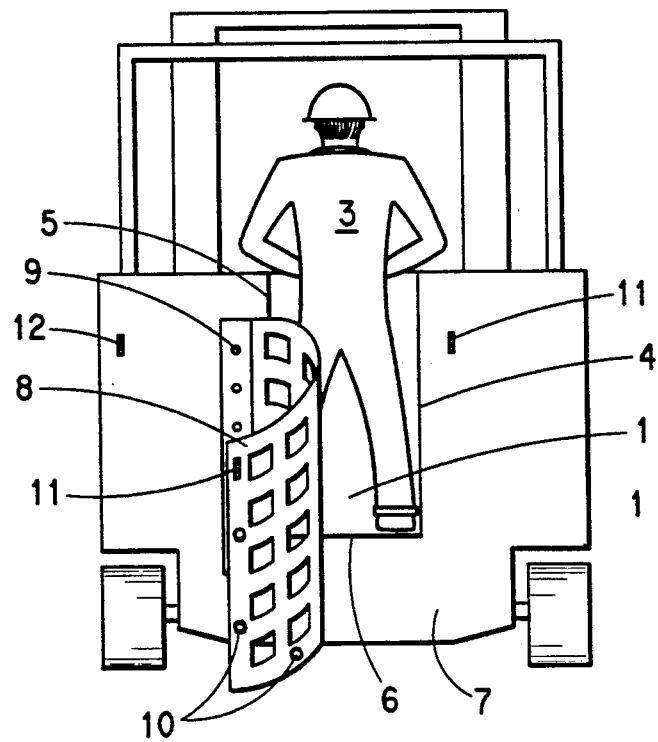
FIG. 2 is a rear view of a rear entry stand-up fork lift truck with the safety net detached to show the fastening means.
Figure 3:
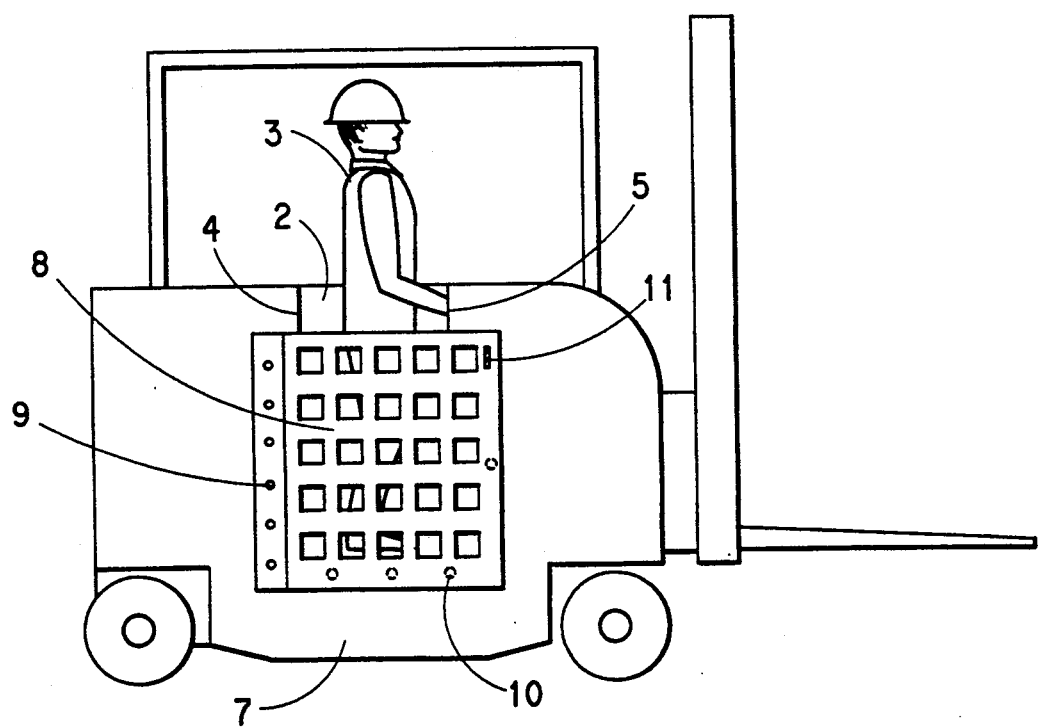
FIG. 3 is a side view of a stand-up fork lift truck with a side entry safety net in place.

The invention will now be described with reference to the drawings.

This invention is useful with any conventional stand-up, front loading fork lift truck, whether it has a rear entry/exit opening 1 or a side entry/exit opening 2. The opening permits the operator 3 to have access to the operator's station where the controls for operating the fork lift truck are located (not illustrated). The opening is defined by two sides of the cab 4 and 5 and the floor 6 of the operator's station. The term bottom of the cab 7 refers to the portion of the cab under the cab opening.

A generally rectangular shaped net 8 made of a flexible material, e.g. nylon or a nylon blend, is securely attached to one side of the cab opening by, in this embodiments, bolts 9. As will be obvious, other means such as adhesives, rivets, etc. can be employed.

The other side of the net 8 is attached to the other side of the cab opening by detachable fasteners, e.g., magnet 10 and/or velcro type fasteners 11. If desired another velcro strip 12 can be employed to secure the net 8 in the open position.

In operation the operator opens the net to obtain access into the operator's station. Once inside the net is closed and secured in place by the detachable fasteners.

The purpose of the net 8 is not to restrain the operator within the cab, but rather serves as a reminder to keep the operator's limbs within the cab while the truck is in operation.

I claim:

1. In a stand-up, front loading, fork lift truck having a cab with an entry/exit opening for access into an operator's station, the opening being defined by two cab sides and the floor of the operator's station, the improvement comprising:
    a rectangular net made of a flexible material having one side securely attached to one side of the cab opening by suitable means,
    the rectangular net extending across the opening and attached to the other side of the cab opening by detachable fastening means, and
    the bottom of the rectangular net being attached to the bottom of the cab by detachable fastening means.

2. The truck of claim 1 wherein the entry/exit opening is in the rear of the cab.

3. The truck of claim 2 wherein the detachable fastening means are magnetic.

* * * * *